United States Patent [19]

Badenhop et al.

[11] Patent Number: 4,627,992

[45] Date of Patent: Dec. 9, 1986

[54] PROCESS FOR THE PRODUCTION OF FILTER ELEMENTS BASED ON AROMATIC POLYAMIDE

[75] Inventors: Charles T. Badenhop, Bad Kreuznach; Anna-Luise Bourguignon, Mittelreidenbach; Joachim Fischer, Bad Kreuznach, all of Fed. Rep. of Germany

[73] Assignee: Seitz-Filter-Werke Theo & Geo Seitz GmbH & Co., Bad Kreuznach, Fed. Rep. of Germany

[21] Appl. No.: 673,654

[22] Filed: Nov. 21, 1984

[30] Foreign Application Priority Data

Nov. 26, 1983 [DE] Fed. Rep. of Germany ....... 3342823

[51] Int. Cl.$^4$ .............................................. B05D 5/00
[52] U.S. Cl. .............................. 427/244; 210/500.28; 210/500.38; 264/41; 264/48; 264/49; 427/246; 427/340; 427/352
[58] Field of Search ............... 427/244, 246, 340, 352; 210/500.2; 264/41, 48, 49

[56] References Cited

U.S. PATENT DOCUMENTS

| | | | |
|---|---|---|---|
| 3,100,721 | 8/1963 | Holden | 427/246 |
| 3,190,766 | 6/1965 | Yuan | 427/246 |
| 3,208,875 | 9/1965 | Holden | 427/246 |
| 3,348,963 | 10/1967 | Fukushima et al. | 264/41 |
| 3,481,765 | 12/1969 | Nakajo et al. | 427/246 |
| 3,492,154 | 1/1970 | Einstman | 427/246 |
| 3,546,004 | 12/1970 | Schachowskoy et al. | 427/246 |
| 3,553,008 | 1/1971 | Reischl et al. | 427/246 |
| 4,217,227 | 8/1980 | Elfert et al. | 264/41 |
| 4,242,208 | 2/1980 | Kawaguchi et al. | 427/246 |

Primary Examiner—John D. Smith
Assistant Examiner—Janyce A. Bell
Attorney, Agent, or Firm—Karl F. Ross; Herbert Dubno

[57] ABSTRACT

Processes for the production of filter elements based on aromatic polyamide in which a semi-finished filter element is produced from a solution of the polyamide in aprotic solvent and the polyamide is then coagulated by immersion in a liquid bath containing precipitating agent may be used for the production of filter elements with a pore size of from 0.05 $\mu$m to 10 $\mu$m for the separation of particles from filtrates by microfiltration if pore formers are added to the solution mixture for the preparation of the semi-finished filtering agent in a quantity of from 20 to 35% by weight and precipitating agents are added in quantity ranging from 1% by weight to the limit of solution stability of the polyamide and if the same solvent is added to the precipitation and coagulation bath as to the solution mixture in a quantity of from 35 to 55% weight and if the same pore former as that used in the solution mixture is added in a quantity of from 1% by weight to 40% by weight, to be specific, in a quantity ranging form 1% by weight to the same percentage pore former content as in the solution mixture if filter elements having an asymmetric cell structure and a pore size of from 0.05 $\mu$m to 10 $\mu$m are to be produced or in a quantity ranging from the same percentage pore former content as in the solution mixture to 40% by weight if filter elements having a symmetric cell structure and a pore size of from 0.05 to 10 $\mu$m are to be produced. The polyamide content of the solution mixture used for the semi-finished filter element, the temperature of the precipitation and coagulation bath and the water content of the precipitation and coagulation bath may then be used as controllable process parameters for obtaining the desired membrane density.

14 Claims, 10 Drawing Figures

PROCESS FOR THE PRODUCTION OF FILTER ELEMENTS BASED ON AROMATIC POLYAMIDE

FIELD OF THE INVENTION

This invention relates to a process for the production of filter elements based on aromatic polyamides, preferably aramides, in the form of filter membranes, membrane/deep filter combinations or filter bodies, in which process a semi-finished filter element is formed from a solution of an aromatic polyamide in an aprotic solvent and the aromatic polyamide of this semi-finished product is coagulated by immersion in a liquid bath containing a precipitating agent.

BACKGROUND OF THE INVENTION

Processes of this type are known from H. Strathmann "Trennung von molekularen Mischungen mit Hilfe synthetischer Membranen" (Separation of molecular mixtures with the aid of synthetic membranes) Publishers Dr. Dietrich Steinkopf Verlag, Darmstadt (Germany) 1979, pages 108 to 120. These known processes, however, have hitherto only resulted in filter membranes of the kind which have only a thin filtration active surface layer with pores measuring from 0.1 nm to 1 nm and which are mounted on a porous sub-layer serving merely as supporting substrate. Processes of the type mentioned above which are known from U.S. Pat. No. 4,229,241, DE-OS No. 2 554 932 and DE-OS No. 2 642 979 also result in such asymmetric filter membranes which have a thin surface skin as filtration active layer and only have pores of the size mentioned above. All these asymmetric filter membranes produced by the known processes described above are suitable for the separation of molecular mixtures by ultrafiltration or haemofiltration. They are not suitable, however, for the separation of particles from filtrates by microfiltration. Membrane filters for microfiltration and a method of producing such filter membranes have already been proposed in the earlier U.S. patent application Ser. No. 499,379 filed May 31, 1983 corresponding to German application No. 32 20 376, according to which aromatic polyamide is dissolved in at least two of the three possible solvents, viz. dimethylacetamide, dimethylformamide and N-methylpyrrolidone, and a solution mixture is prepared from such solutions in different solvents. When such a solution mixture of aromatic polyamide with at least two different solvents has been poured out to form a layer or membrane, the aromatic polyamide is precipitated by the action of moist air and the solvent is then washed out. This process, however, is complicated for large scale technical production and not trouble-free. It also has the disadvantage that considerable quantities of solvent get into the moist air in the process of coagulation and therefore seriously pollute the environment as well as giving rise to considerable difficulties in the recovery of the solvent.

OBJECT OF THE INVENTION

It is an object of the present invention, starting from the known processes for the production of asymmetric filter membranes suitable for ultrafiltration and haemofiltration, to open up the possibility of producing such filter membranes which, while having an asymmetric cell structure or a symmetric cell structure, have filtration-active pore sizes of from 0.05 μm to 10 μm and are suitable for the separation of particles by microfiltration, using reliable procedures which can be controlled to give reproducible results, substantially avoid environmental pollution and provide advantageous possibilities of recovering the substances used in the process.

SUMMARY OF THE INVENTION

Proceeding from the basic process mentioned above, this problem is solved according to the invention in that (a) a solution mixture is prepared from an aromatic polyamide in an amount of from 6 to 14% by weight, which has optionally been brought into solution with the aid of solvent auxiliaries, a pore former in an amount of from 20 to 35% by weight, a precipitating agent in an amount ranging from 1% by weight to the limit of solution stability of the polyamide, the remainder consisting of aprotic, preferably polar organic-chemical solvents, (b) the semi-finished filter element is formed from this solution mixture and is treated in a precipitation and coagulation bath at a bath temperature of from 5° C. to 35° C. over a period of from 3 to 10 minutes to complete precipitation of the aromatic polyamide, the precipitation and coagulation bath containing 35 to 55% by weight, preferably 40 to 50% by weight, of the same solvent as in the solution mixture and from 1% by weight to 40% by weight of the same pore former as the solution mixture, the remainder consisting of a precipitating agent, that is to say it has (b1) a pore former content ranging from 1% by weight to the same percentage of pore former as the solution mixture for forming filter elements with an asymmetric cell structure and a pore size of the active separating layer of from 0.05 μm to 10 μm for separating particles from filtrates by microfiltration or (b2) a pore former content ranging from the same percentage pore former content as the solution mixture to 40% by weight for forming filter elements having a symmetric cell structure and a pore size of from 0.05 μm to 10 μm for separating particles from filtrates by microfiltration, and (c) after coagulation of the aromatic polyamide, the filter element is washed in water to complete removal of the solvent, any solvent auxiliary used and pore former and any aprotic precipitating agent used.

The process according to the invention affords the advantage that the process parameters which determine the development of the type of cell structure and pore distribution required and ensure the desired pore size can be adjusted to be reliably reproducible and can be monitored. All process parameters can be reliably and accurately adapted to one another. The chemical substances used in the process can be recovered and returned to the process. Compared with the process proposed in aforementioned, the special advantage is achieved that it is no longer necessary to deal with a mixture of different solvents. The process according to the invention may be carried out with a single solvent, preferably dimethylformamide. This solvent is exchanged in the liquid phase in the precipitation and coagulation bath and also transferred to a liquid phase in the washing out process, i.e. to the wash water. Since the precipitation and coagulation bath in the process according to this invention contains the same solvent as the solution mixture used for forming the semi-finished filter element, the precipitation and coagulation bath can easily be maintained at its previously determined composition. The process according to the invention may therefore particularly easily and advantageously be carried out as a continuous process.

The invention is based on the surprising finding that apart from the thermodynamic and kinetic theories developed in the literature, in particular by Strathmann in "Trennung von molekularen Mischungen mit Hilfe Synthetischer Membranen", pages 120 to 125, other, as yet not clearly definable physical interactions exist which have a major influence on the formation of the cell structure. These interactions are reproducible as has been demonstrated experimentally and are used in the process according to the invention.

It is particularly characteristic of the process according to the invention that the solution mixture used for producing the semi-finished filter element and the precipitation and coagulation bath have compositions which are to a large extent both based on substantially the same principle (apart from the resin content of the solution mixture), namely:

(1) aromatic polyamide resin
(2) solvent
(3) pore former
(4) precipitating agent.

Each of these components has some influence on the properties of the filter element formed.

(1) Aromatic polyamide resin

The resin content of the solution mixture has no influence on the nature of the cell structure (symmetric or asymmetric). It influences only the pore size. The higher the resin content, the denser is the resulting filter element.

(2) Solvent

The solvents used may be aprotic, liquid chemical substances of a kind in which the given aromatic polyamide resin is soluble. Organic chemical solvents such as dimethylformamide and dimethylacetamide are particularly suitable. It was found that when dimethylacetamide was used as solvent, the tendency to the formation of a skin on the filter element was considerably greater than that resulting from the use of dimethylformamide as solvent. This difference, however, can be overcome by adjusting other parameters of the process.

(3) Pore former

In the process according to the invention, the pore former plays the most important role, both in connection with the solution mixture and in connection with the precipitation and coagulation bath. The pore formers used in the process according to the invention are preferably ethylene glycols, ranging from the simple ethylene glycol (molecular weight $\approx 50$) to polyethylene glycols up to the polyethylene glycol 400 (molecular weight $\approx 400$). As regards its action on the cell structure of the filter element, the pore former has a critical molecular weight range, which can be determined for the process according to the invention by a test series.

For example, ethylene glycols have a critical molecular weight range of from 150 to 400, within which lies the optimum for the formation of the cell structure. Below a molecular weight of 150 (triethylene glycol), ethylene glycols are too incompatible with the solution mixture, with the result that the aromatic polyamide precipitates fairly rapidly so that an optimum cell structure cannot develop. Conversely, experiments carried out in connection with the process according to the invention have shown that polyethylene glycol 400 causes only very slow precipitation and coagulation of the resin due to its high compatibility with the aromatic polyamide resin and therefore again does not lead to an optimum formation of cell structure. It has been found in the context of this invention that by mixing two ethylene glycols (for example, diethylene glycol and polyethylene glycol 400), each of which on its own is incapable of giving rise to an optimum cell structure, it is possible to obtain a pore former which has the optimum properties for developing the cell structure. It is therefore particularly advantageous in the process according to the invention to use a pore former consisting of a 2:1 mixture of polyethyleneglycol 400 and diethylene glycol both in the solution mixture and in the precipitation and coagulation bath.

(4) Precipitating agent

In the process according to the invention, the solution mixture used for forming the semi-finished filter element should already contain a certain proportion of precipitating agent, which should be the same as that used in the precipitation and coagulation bath. This procedure ensures that the transfer of precipitating agent into the semi-finished filter element in the precipitation and coagulation bath will not be too abrupt and will be easily controlled. Water is preferably used as the precipitating agent in the process according to the invention.

In the context of this invention, it has further been found that the composition of the precipitation and coagulation bath in which the aromatic polyamide in the semifinished filter element precipitates and coagulates within a certain dwell time has a powerful influence on the properties of the filter element formed, in particular on the cell structure. An interaction exists between the composition of the precipitation and coagulation bath and the composition of the solution mixture from which the semi-finished filter element was formed, this interaction in many cases not being explainable in terms of the thermodynamic and kinetic theory given in the literature and in many cases contradicting this theory, as can be proved experimentally.

It has been found that in the process according to the invention, the transfer of pore former from the semi-finished filter element into the precipitation and coagulation bath is the cause for the asymmetry of the cell structure of the filter element. If the precipitation and coagulation bath contains no pore former at all, the transfer of precipitating agent from the precipitation and coagulation bath into the surface of the semi-finished filter element and conversely the transfer of solvent and pore former from the surface of the semi-finished filter element into the precipitation and coagulation bath occur so rapidly at the liquid-liquid interface between semi-finished filter element and precipitation and coagulation bath that a surface skin forms on the semi-finished filter element at this liquid-liquid interface, quite regardless of the previously held views based on the thermodynamic and kinetic theory. The addition of solvents and pore formers to the precipitation and coagulation bath attenuates these phenomena at the liquid-liquid interface to such an extent that the formation of a closed surface skin is virtually eliminated and the mutual exchange of precipitating agent and solvent between the precipitation bath and the semi-finished filter element is sufficient to produce a porous surface on the semi-finished filter element at the liquid-liquid interface. This effect is assisted by the high viscosity of the pore former and hence low mobility of the molecules. If in the process according to the invention, the pore former content in the precipitation and coagulation bath is increased to such an extent that it is equal to or even greater than the pore former content in the solution mixture forming the semi-finished filter element, then no transport of pore former from the semi-finished filter element into the precipitation and coagulation bath occurs during the process of precipitation and coagulation. The only substance then flowing from the semi-finished filter element into the precipitation and coagulation bath is solvent whereas precipitating agent moves from the precipitation and coagulation bath into the semi-finished filter element and indeed it is transferred by means of the pore former into the whole depth of the semi-finished filter element. It is thereby possible to produce a symmetric cell structure in the filter element, virtually regardless of the temperature of the precipitation and coagulation bath. On the other hand, by having a lower pore former content in the precipitation and coagulation bath than in the solution mixture which forms the semi-finished filter element, it is possible to provide for a reproducible, previously determinable transfer of pore former from the semi-finished filter element into the precipitation and coagulation bath. This transfer of pore former is then a measure of the asymmetry in the cell structure of the filter element. These new realisations discovered in the context of this invention contrast with the previous assumptions, in particular the previous thermodynamic and kinetic theory.

SPECIFIC DESCRIPTION AND EXAMPLES

Embodiments given by way of example are described below with reference to the microphotographs.

EXAMPLE 1

A basic mixture is first prepared from
13.9% by weight of a copolymer of m-phenylenediamine and isophthalic acid, decomposition point about 370° C.
5.6% by weight LiCl
80.5% by weight dimethylformamide.

A membrane mixture having the following composition is prepared from this basic mixture with the addition of a further quantity of dimethylformamide and a mixture of polyethylene glycol (PEG) 400/diethylene glycol (DEG) and water:
8% by weight of polyamide resin
25% by weight of PEG 400 : DEG (2:1)
4% by weight of water
remainder dimethylformamide.

This membrane mixture is poured out on a smooth strip of polyethylene to form a layer having a thickness of 150 to 250 μm (thickness of wet layer) and this layer is transferred together with the strip of polyethylene into a precipitation and coagulation bath.

The precipitation and coagulation bath has the following composition:
48% by weight of dimethylformamide
25% by weight of PEG 400 : DEG (2:1)
27% by weight of water.

The precipitation and coagulation bath was maintained at a temperature of 19° C. The dwell time of the layer in the precipitation and coagulation bath was 9 minutes. The membrane emerging from the precipitation and coagulation bath was washed in water until it was completely free from solvent, pore former and solvent auxiliary (LiCl). The properties of the membrane were then measured as follows:
Rate of flow of water through 0.20 min/300 ml over the membrane: a membrane surface of 15 $cm^2$ at a pressure difference of 0.9 bar
Blow point of the membrane: 1.3 bar.

Figure 1:
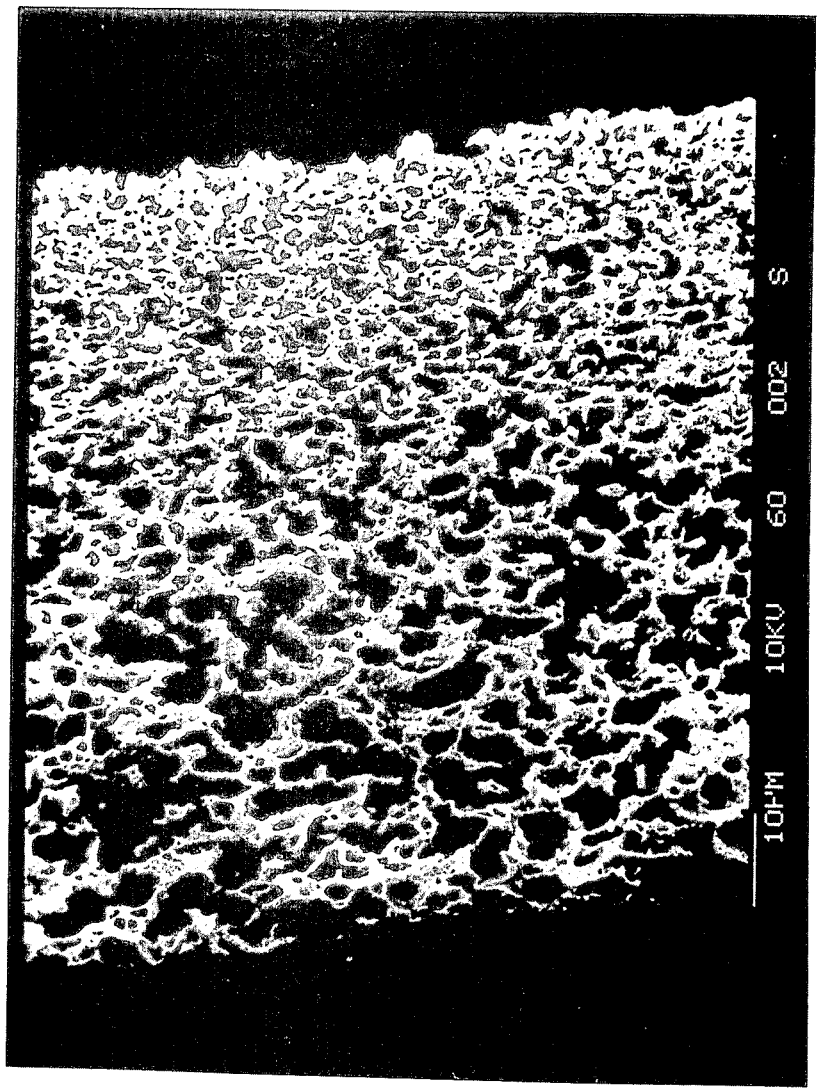
FIGS. 1-10 are electron-microscopy microphotographs illustrating the invention.
Figure 2:
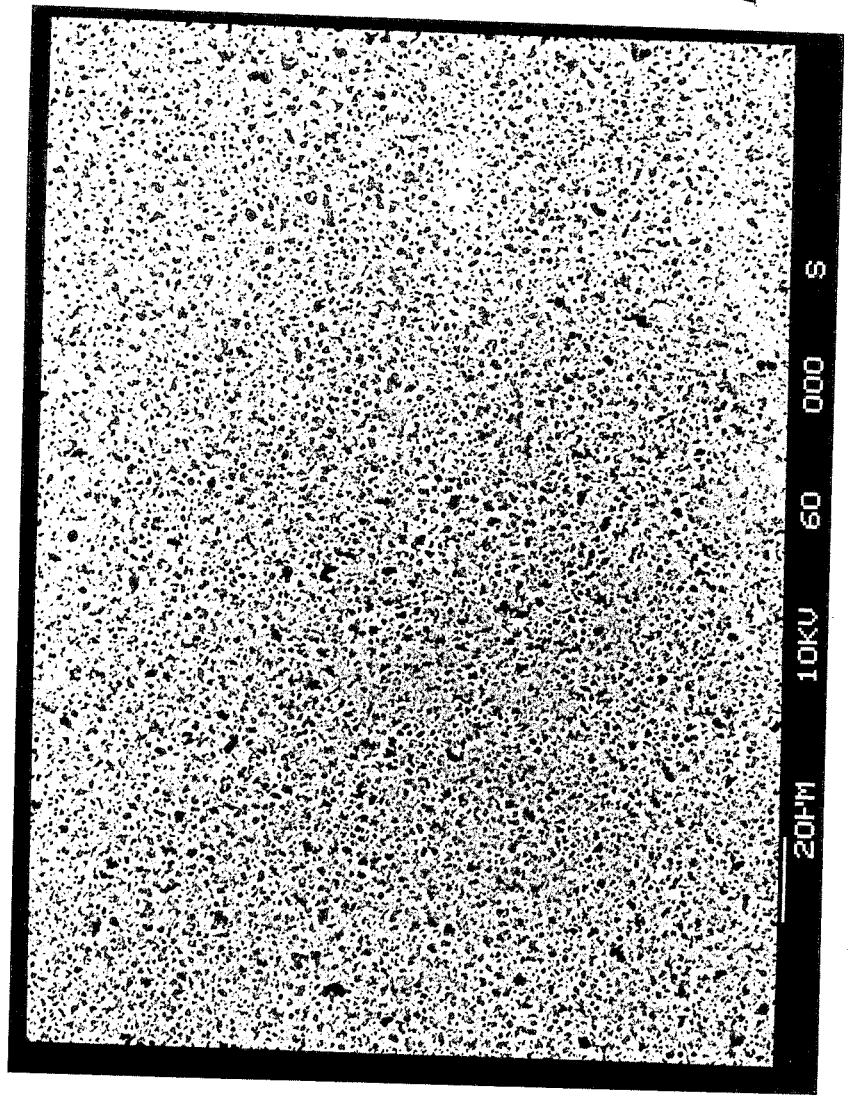
Figure 3:
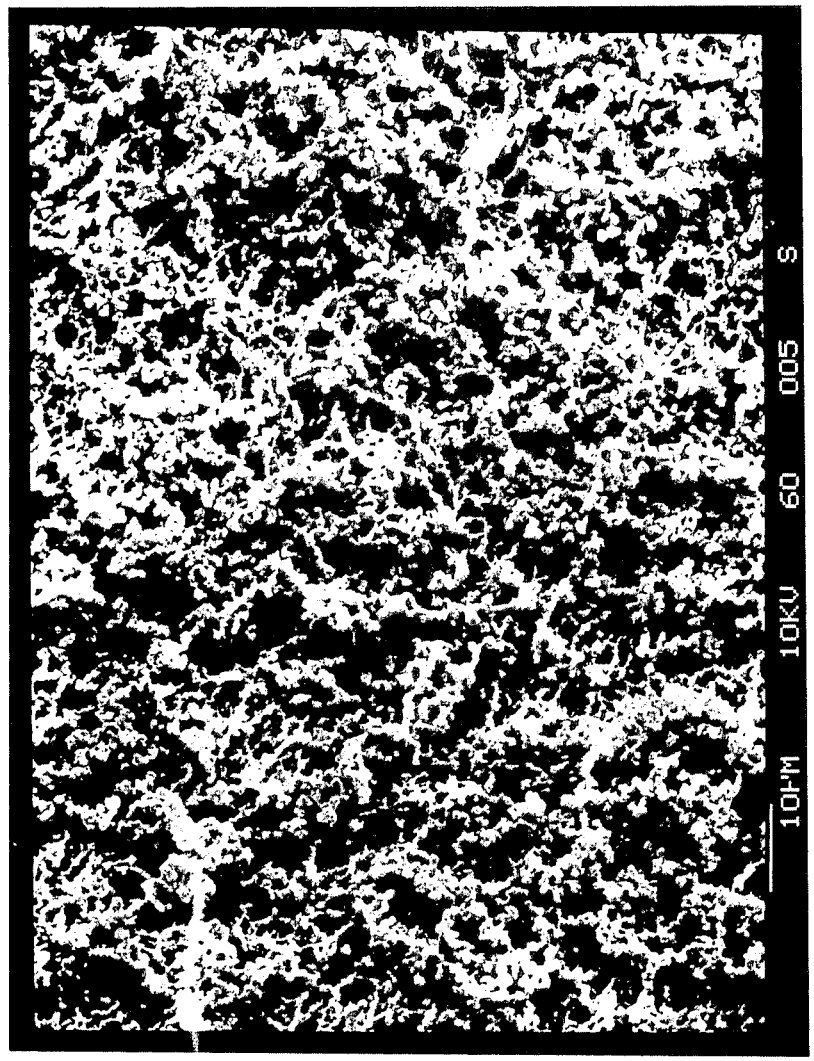

Raster electron microscopic photographs were taken of the membrane. These show:
FIG. 1: An edge section of the membrane, with the upper side of the membrane at the righthand side of the picture:
FIG. 2: An electron microscopic photograph of the underside of the membrane, and
FIG. 3: An electron microscopic photograph of the upper side of the membrane.

The scale of enlargement of the Figures is indicated on the left underneath the image section proper.

EXAMPLE 2

Additional dimethylformamide, pore former and water are added to the basic mixture indicated in Example 1 in such quantities that a membrane mixture having the following composition is obtained:
9% by weight aromatic polyamide resin
25% by weight PEG 400DEG (2:1)
4% by weight water
remainder dimethylformamide.

This membrane mixture is poured out on to a smooth strip of polyethylene as in Example 1 to form a layer having a thickness of 150 to 250 μm (thickness of the wet layer) and transferred to the precipitation and coagulation bath. The precipitation and coagulation bath had the same composition as in Example 1. The temperature of the precipitation and coagulation bath was maintained at 19° C. as in Example 1. The dwell time in the precipitation and coagulation bath was 7 minutes. The following values were measured after the membrane had been washed:
Rate of flow of water: 0.71 min/300 ml, determined through the membrane: as in Example 1
Blow point of the membrane: 2.6 bar.

Figure 4:
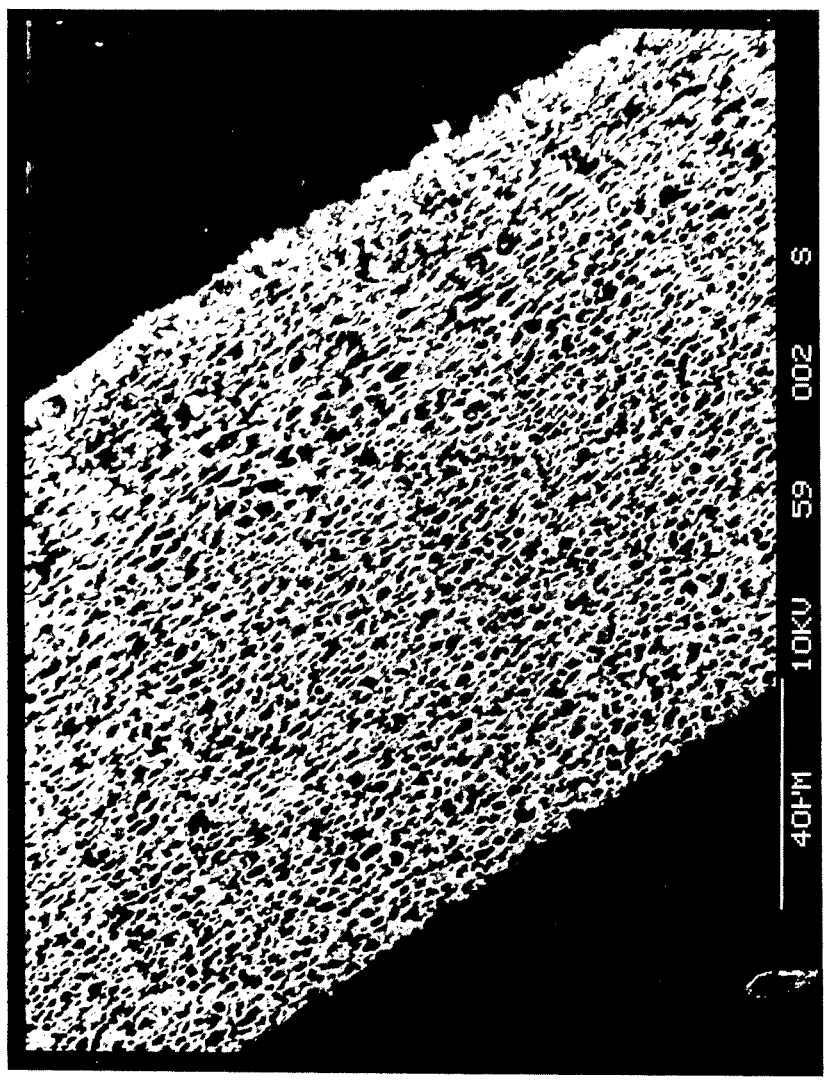
Figure 5:
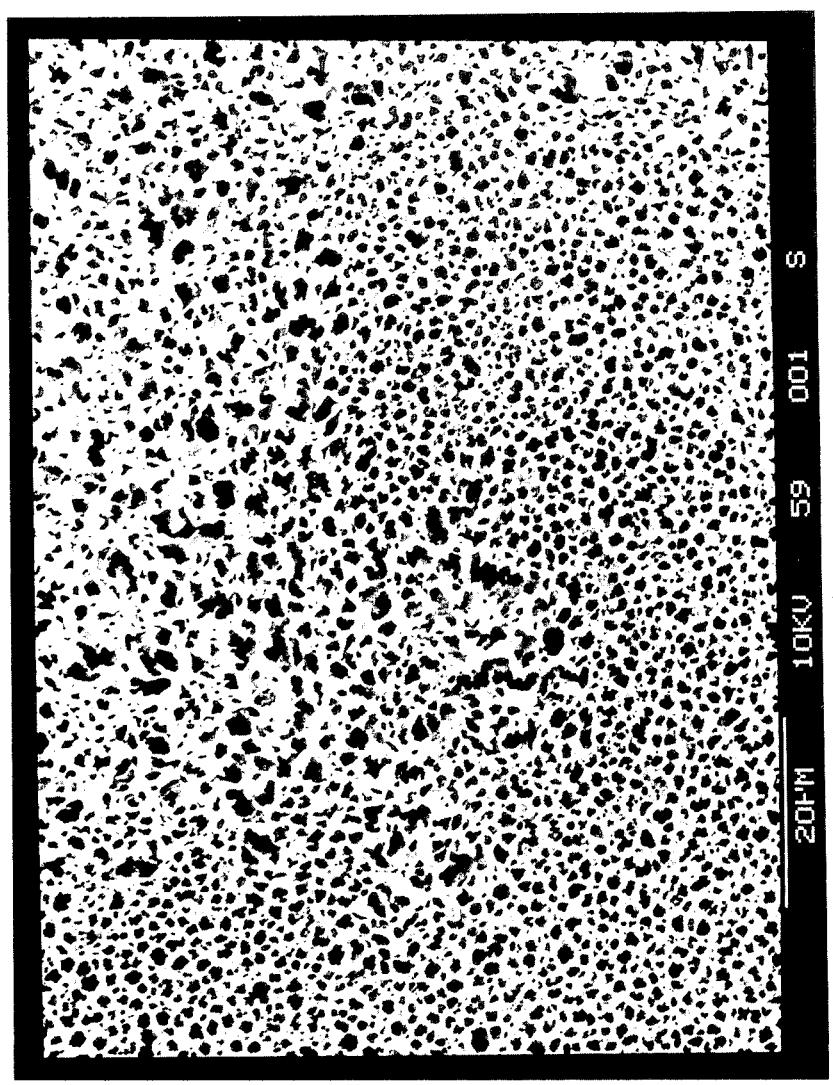
Figure 6:
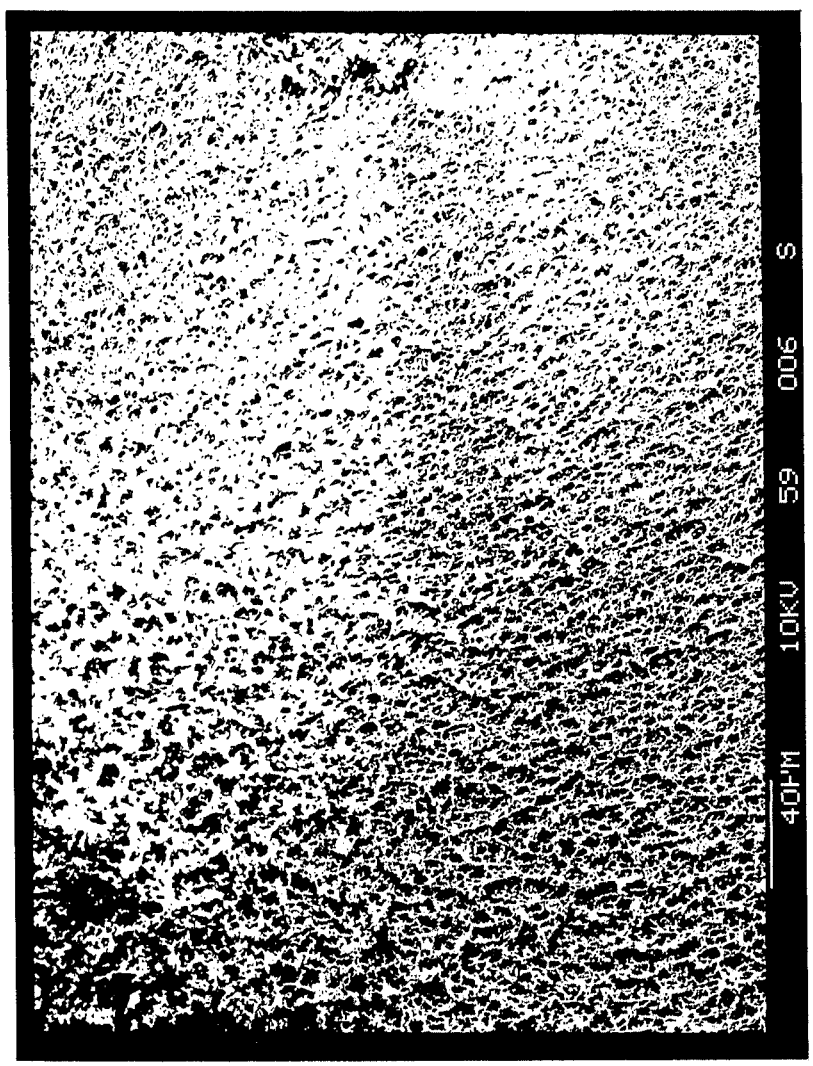

Raster electron microscopic photographs were taken of the membrane, as follows:
FIG. 4: An edge section photograph, with the upper side of the membrane situated on the righthand side of the picture;
FIG. 5: An electron microscopic photograph of the underside of the membrane, and
FIG. 6: An electron microscopic photograph of the upper side of the membrane.

The scale of enlargement is shown at the bottom left of the pictures.

A comparison of FIGS. 1 to 6 shows that both membranes are symmetrical in structure. A denser membrane is obtained in Example 2 due to the higher resin content of the membrane mixture.

EXAMPLE 3

A membrane mixture having the following composition was prepared:
8% by weight copolymer of m-phenylenediamine and isophthalic acid, decomposition point about 370° C.
30% by weight polyethylene glycol 400
6% by weight water
remainder dimethylformamide as solvent.

This membrane mixture was poured out on a polyethylene strip to form a layer having a thickness (wet) of 150 to 250 μm and transferred to the precipitation and coagulation bath. The precipitation and coagulation bath had the following composition:
30% by weight water
46.7% by weight dimethylformamide
23.3% by weight polyethylene glycol 400.

The precipitation and coagulation bath was maintained at 19° C.

After complete coagulation, the membrane was washed. Raster electron microscopic photographs were taken of the membrane.

Figure 7:
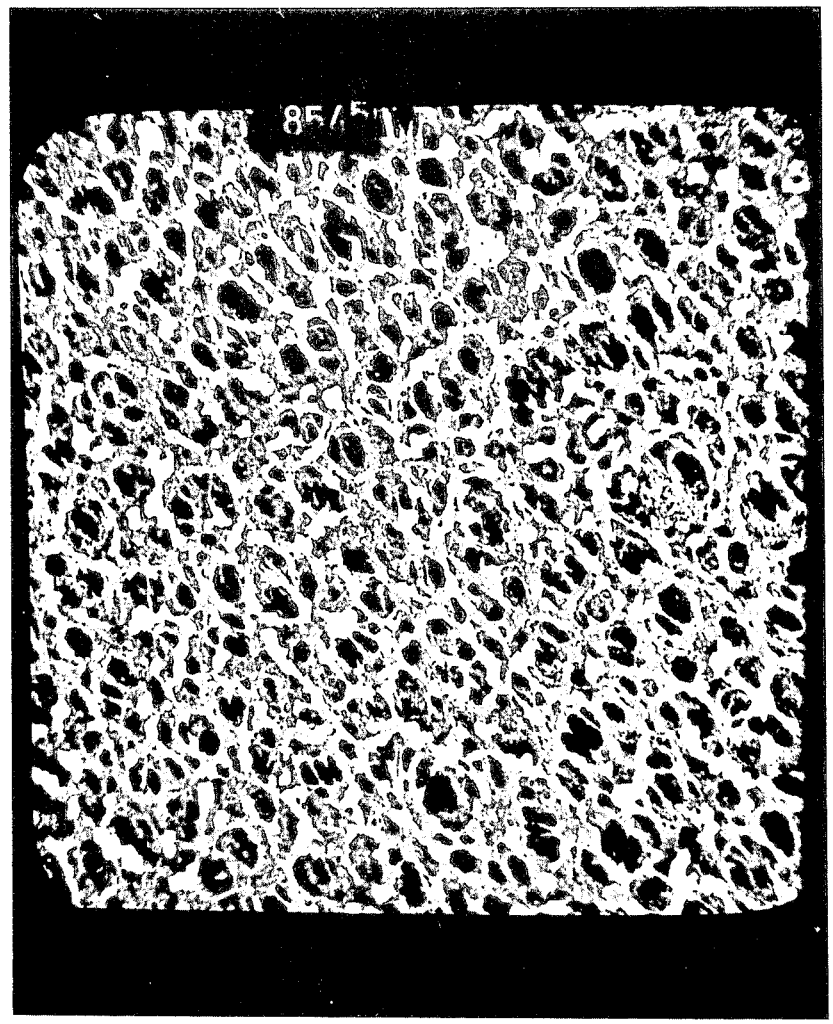

FIG. 7 shows the upper side of the membrane in 1900 times enlargement.

EXAMPLE 4

A membrane mixture having the following composition was prepared:
8% by weight copolymer of m-phenylenediamine and isophthalic acid, decomposition point about 370° C.
25% by weight polyethylene glycol
5% by weight water
remainder dimethylacetamide.

This membrane mixture was poured out on a polyethylene strip to form a layer as in Example 3 and transferred to the precipitation and coagulation bath. The precipitation and coagulation bath had the following composition:
30% by weight water
46.7% by weight dimethylacetamide
23.3% by weight polyethylene glycol.

The temperature of the precipitation and coagulation bath was maintained at 38° C.

Raster electron microscopic photographs were taken of the membrane after it had completely coagulated and been washed.

Figure 8:
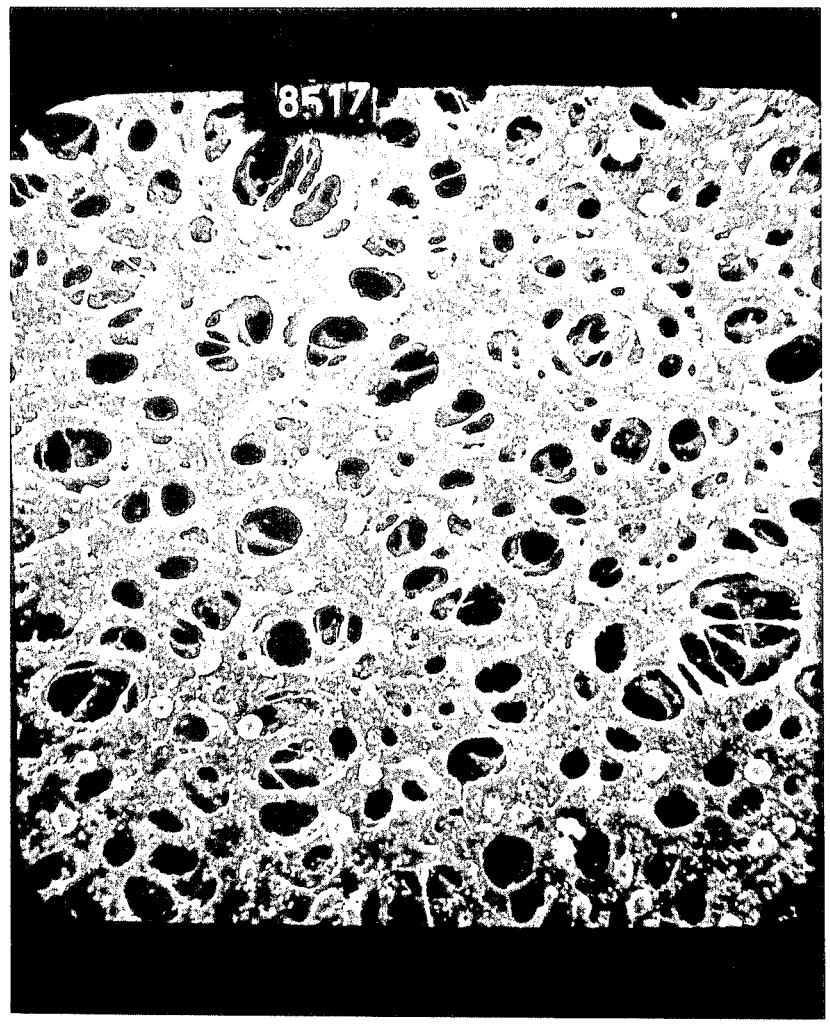

FIG. 8 shows the upper side of the membrane in 1850 times enlargement.

A comparison of FIGS. 7 and 8 shows that when the pore former content in the precipitation and coagulation bath is only just below the pore former content in the membrane mixture, marked differences already occur in the formation of pores on the upper side of the membrane, depending on the solvent used.

FIG. 8 shows that when dimethylacetamide is used as solvent, a clear indication of skin formation can already be seen on the upper side of the membrane. In Example 3, the pore former content in the precipitation and coagulation bath is much further below the pore former content in the membrane mixture than in Example 4 (23.3% by weight as compared with 25% by weight) and yet FIG. 7 shows no clear tendency to skin formation on the surface of the membrane.

EXAMPLE 5

A membrane mixture having the following composition was prepared from a basic mixture according to Example 1 by the addition of dimethylformamide, pore former and water:
8% by weight aromatic polyamide resin
25% by weight PEG 400:DEG (2:1)
4% by weight water
remainder dimethylformamide.

This membrane mixture was poured out on a smooth polyethylene strip as in Example 1 to form a layer 150 to 250 μm in thickness (wet) and transferred to the precipitation and coagulation bath. The precipitation and coagulation bath had the following composition:
48% by weight dimethylformamide
15% by weight PEG 400:DEG (2:1)
37% by weight water.

The precipitation and coagulation bath was maintained at 19° C. The dwell time of the membrane in the precipitation and coagulation bath was 6 minutes. After complete coagulation and washing, the data of the membrane produced were measured as follows:
Rate of throughflow of water: 1.21 min/300 ml determined as in Example 1,
Blow point: 1.4 bar.

EXAMPLE 6

A membrane mixture as in Example 5 in the form of a layer cast as in Example 5 was transferred to a precipitation and coagulation bath having the same composition as in Example 5 but the temperature of the precipitation and coagulation bath was maintained at 25° C. The dwell trime of the membrane in the precipitation and coagulation bath was 5 minutes. After complete coagulation and washing of the membrane, the following values were measured:
Rate of throughflow of water: 0.56 min/300 ml determined as in Example 1,
Blow point: 1.3 bar.

EXAMPLE 7

A membrane mixture having the same composition as in Example 5 was poured out on a polyethylene strip in the same manner as in Example 5 and transferred to a precipitation and coagulation bath having the same composition as in Example 5 but the temperature of the precipitation and coagulation bath was maintained at 35° C. The dwell time of the membrane in the precipitation and coagulation bath was 3 minutes. The following data were measured after complete coagulation and washing of the membrane:
Rate of throughflow of water: 0.45 min/300 ml determined as in Example 1,
Blow point: 1.1 bar.

A comparison of Examples 5 to 7 shows that in the process according to the invention, the behaviour of the semi-finished filter element does not conform to the thermodynamic, kinetic theory. According to this theory, the membranes produced in the hotter precipitation and coagulation bath and therefore precipitated and coagulated more rapidly should be denser. Examples 5 to 7 show, however, that the contrary occurs, namely the membrane obtained is less dense when the precipitation and coagulation bath is at a higher temperature and the coagulation time is therefore shorter.

EXAMPLE 8

A membrane mixture having the following composition was prepared from a basic mixture of Example 1 by the addition of dimethylformamide, pore former and water:
8% by weight aromatic polyamide resin
25% by weight PEG 400:DEG (2:1)
8% by weight water
remainder dimethylformamide.

This membrane mixture is poured out on a smooth strip of polyethylene as in Example 1 to form a layer 150 to 250 μm in thickness (wet) and transferred to the precipitation and coagulation bath. The precipitation and coagulation bath has the following composition:
48% by weight dimethylformamide
20% by weight PEG 400:DEG (2:1)
32% by weight water.

The bath temperature was maintained at 35° C. The dwell time of the membrane in the precipitation and coagulation bath was 4 minutes. After complete coagulation and washing, the following data were measured on the membrane produced:
Rate of throughflow of water: 0.26 min/300 ml determined as in Example 1,
Blow point: 1.0 bar.

EXAMPLE 9

A membrane mixture as described in Example 8 was poured out on a smooth polyethylene strip in the same manner as in Example 8 and transferred as a layer 150 to 250 μm in thickness (wet) to the precipitation and coagulation bath. The composition of the precipitation and coagulation bath was as follows:
48% by weight dimethylformamide
15% by weight PEG 400:DEG (2:1)
37% by weight water.

The temperature of the precipitation and coagulation bath was maintained at 35° C. The dwell time of the membrane in the precipitation and coagulation bath was 3 minutes.

After complete coagulation and washing, the following data were measured on the membrane produced:
Rate of throughflow of water: 0.45 min/300 ml determined as in Example 1,
Blow point: 1.1 bar.

EXAMPLE 10

A membrane mixture as described in Example 8 was poured out on a smooth polyethylene strip in the same manner as in Example 8 to form a layer having a thickness (wet) of 150 to 250 μm and transferred to a precipitation and coagulation bath. The composition of the precipitation and coagulation bath was as follows:
48% by weight dimethylformamide
10% by weight PEG 400:DEG (2:1)
42% by weight water.

The temperature of the precipitation and coagulation bath was maintained at 35° C. The dwell time of the membrane in the precipitation and coagulation bath was 3 minutes.

After complete coagulation and washing, the following data were measured on the membrane produced:
Rate of throughflow of water: 0.44 min/300 ml determined as in Example 1.
Blow point: 1.3 bar.

EXAMPLE 11

A membrane mixture as in Example 8 was poured out on a smooth strip of polyethylene in the same manner as in Example 8 to form a layer having a thickness (wet) of and transferred to a precipitation and coagulation bath. The composition of the precipitation and coagulation bath was as follows:
48% by weight dimethylformamide
5% by weight PEG 400:DEG (2:1)
47% by weight water, The temperature of the precipitation and coagulation bath was maintained at 35° C. The dwell time of the membrane in the precipitation and coagulation bath was 3 minutes.

After complete coagulation and washing, the following data were measured on the membrane produced:
Rate of throughflow of water: 0.49 min/300 ml determined as in Example 1.
Blow point: 1.2 bar.

EXAMPLE 12

A membrane mixture as in Example 8 was poured out on a smooth polyethylene strip in the same manner as in Example 8 to form a layer having a thickness (wet) of 150 to 250 μm and transferred to a precipitation and coagulation bath. The composition of the precipitation and coagulation bath was as follows:
48% by weight dimethylformamide
52% by weight water.

The temperature of the precipitation and coagulation bath was maintained at 35° C. The dwell time of the membrane in the precipitation and coagulation bath was 1 minute. After complete coagulation and washing, the following data was measured on the membrane produced:
Rate of throughflow of water: 0.89 min/300 ml, determined as in Example 1,
Blow point: 1.3 bar.

A comparison of Examples 8 to 12 shows the following: If the quantity of solvent in the precipitation and coagulation bath is kept constant and the quantity of pore former is reduced and the quantity of precipitating agent (water) increased, then the membrane precipitates more rapidly and at the same time more densely. At the same time, the formation of an upper skin is increased and the considerable reduction in the rate of throughflow of water in Example 12 shows that when pore former is completely absent from the precipitation and coagulation bath, a transition to the formation of a substantially closed upper skin takes place.

EXAMPLE 13

A membrane mixture having the following composition was prepared from a basic mixture according to Example 1 by the addition of pore former and water:
11% by weight aromatic polyamide resin
17% by weight PEG 400
4% by weight water.

This membrane mixture was poured out in the same manner as in Example 1 to form a layer 150 to 250 μm in thickness (thickness of wet layer) and transferred to a precipitation and coagulation bath. The precipitation and coagulation bath had the following composition:
50% by weight dimethylformamide
20% by weight PEG 400
30% by weight water.

The temperature of the precipitation and coagulation bath was maintained at 35° C. The dwell time of the membrane in the precipitation and coagulation bath was 4 minutes.

After complete coagulation and washing the following data were measured on the membrane produced:
Rate of throughflow of water: 1.13 min/300 ml determined as in Example 1,
Blow point: 3.0 bar.

Figure 9:
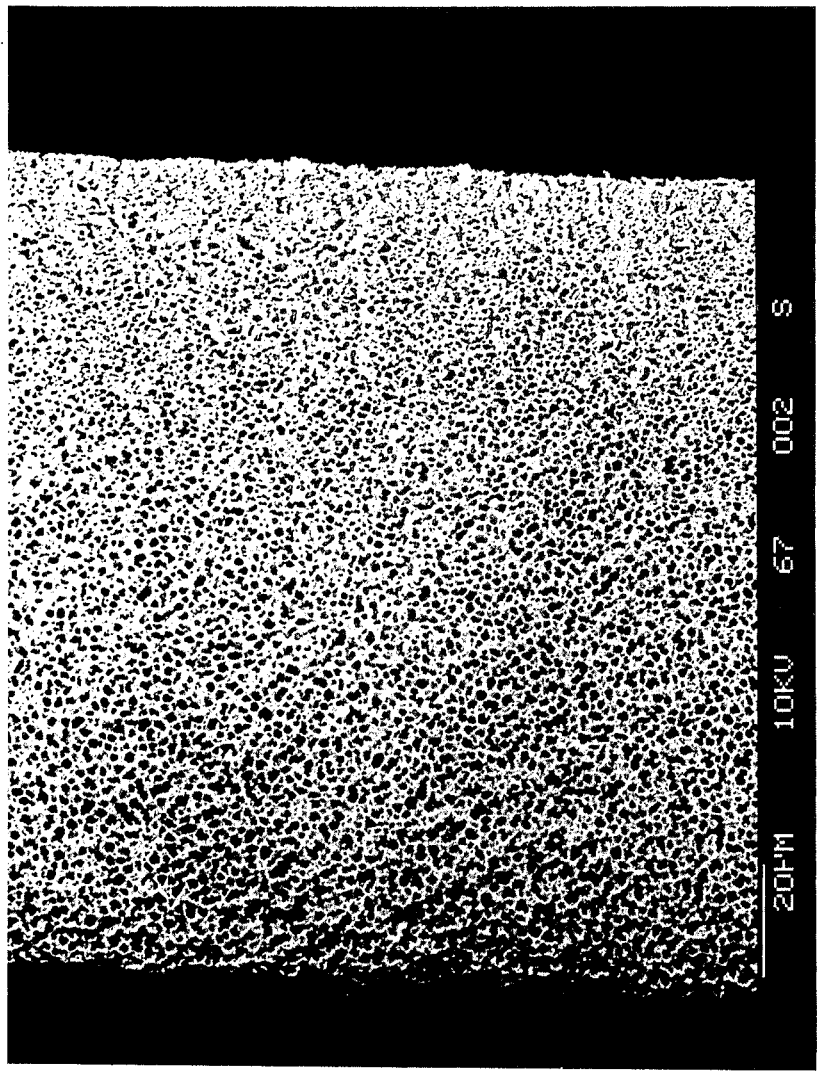

In addition, raster electron microscopic photographs were taken of the membrane. FIG. 9 shows the raster electron microscopic photograph of the edge section of the membrane, the upper side being situated on the right of the picture. The membrane structure is regular and symmetric. No skin formation on the upper or under side.

EXAMPLE 14

A membrane mixture having the following composition was prepared from the basic mixture of Example 1 by the addition of dimethylformamide, pore former and water:

7% by weight aromatic polyamide resin
25% by weight PEG 400:DEG (2:1)
4% by weight water This membrane mixture was poured out on a smooth polyethylene strip in the same manner as in Example 1 to form a layer having a thickness of 150 to 250 μm (thickness of wet layer) and transferred with this polyethylene strip to a precipitation bath. The composition of the precipitation bath was as follows:

48% by weight dimethylformamide
10% by weight PEG 400:DEG (2:1)
42% by weight water.

The precipitation and coagulation bath was maintained at a temperature of 19° C. The dwell time of the membrane in the precipitation and coagulation bath was 5 minutes. After complete coagulation and washing, the following data were measured on the membrane produced:

Rate of throughflow of water: 0.60 min/300 ml determined as in Example 1,
Blow point: 0.7 bar.

Figure 10:
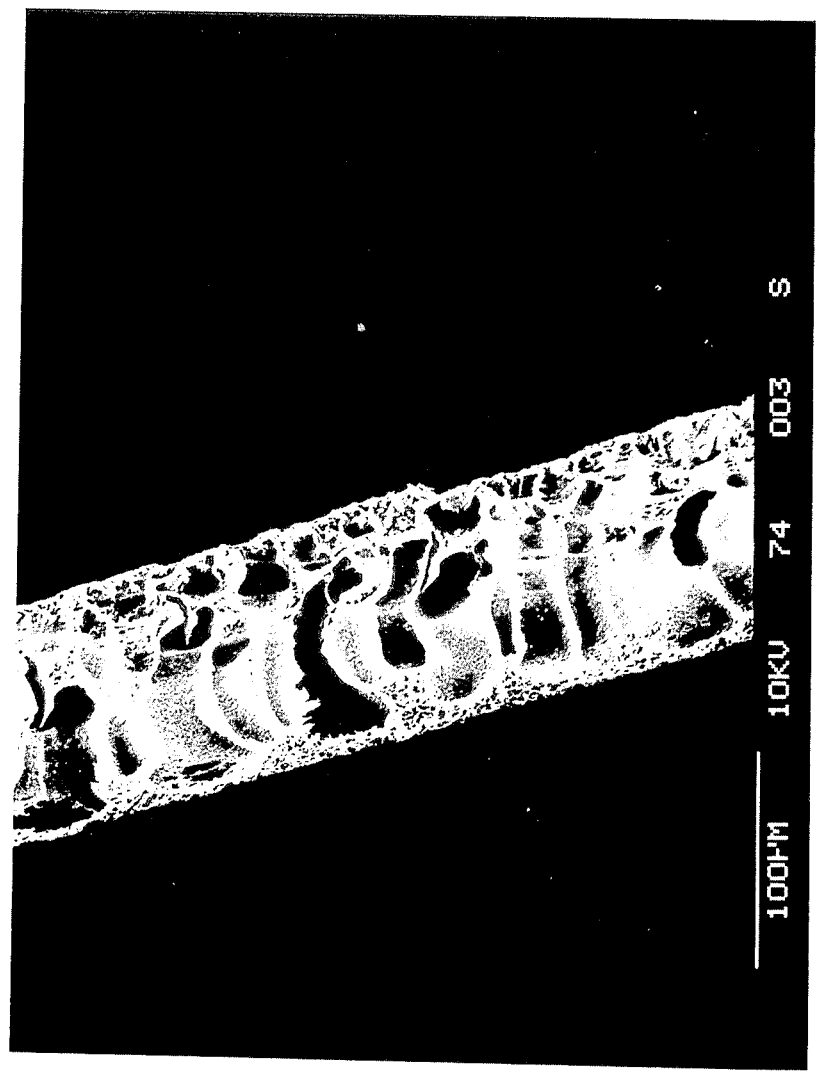

Raster electron microscopic photographs were taken of the membrane. FIG. 10 shows the raster electron microscopic photograph of an edge section of a membrane produced according to Example 14. The membrane has a strongly asymmetric structure. This is the cause of the low blow point.

We claim:

1. A process for the production of an aromatic-polyamide-based filter element in the form of a filter membrane, membrane/deep filter combination or filter body, said process comprising the steps of:
   (a) preparing a solution of a filter-forming aromatic polyamide in an aprotic solvent;
   (b) preparing a solvent mixture by adding to the said solvent of the aromatic polyamide a liquid pore former and a precipitating agent in such quantities that the said solvent mixture contains:
      a pore former, said former being ethylene glycols of molecular weight ranging from 50 to 400, in a quantity of from 20 to 35% by weight,
      a precipitating agent, said agent being water, in a quantity ranging from 1% by weight to the limit of the solution stability of the polyamide, and
      remainder comprising aprotic solvent, the said solution of the aromatic polyamide being retained in a true stable solution status within the said solution mixture;
   (c) forming a desired semi-finished filter element by pouring said solution mixture unto a smooth support strip and treating immediately after forming the said semi-finished fliter element in a precipitation and coagulation bath at a bath temperature of from 5° C. to 35° C. over a period from 3 to 10 minutes until complete precipitation of the aromatic polyamide, said precipitation and coagulation bath having apart from the aromatic polyamide the same components but at a substantially higher quantity of precipitation agent than said solution mixture, said precipitation and coagulation bath containing from 35 to 55% by weight of the same solvent as the solvent mixture and from 1% by weight to 40% by weight of the same pore former as the solution mixture, the remainder being precipitating agent, so that the bath has
      (c1) a pore former content of from 1% by weight to the same percentage pore former content as the solution mixture for forming filter elements having an asymmetric cell structure and a pore size in an active separating layer formed from said aromatic polyamide of from 0.05 μm to 10 μm for separating particles by microfiltration or
      (c2) a pore former content in the range extending from the same percentage pore former content as the solution mixture to 40% by weight, for forming filter elements having a symmetric cell structure and a pore size of 0.05 μm to 10 μm for the separation of particles by microfiltration, whereas
   (d) after coagulation of the aromatic polyamide, the filter element is washed in water unit complete removal of the solvent and pore former and precipitation agent used.

2. The process defined in claim 1, wherein a solution of said aromatic polyamide is prepared in a polar organic chemical solvent.

3. The process defined in claim 2, wherein said aromatic polyamide is a copolymer of m-phenylenediamine and isophthalic acid having a decomposition point at about 370° C. and is dissolved together with an alkali metal salt or alkaline earth metal salt, in at least one solvent selected from the group which consists of dimethylformamide, dimethylacetamide and N-methylpyrrolidone.

4. The process defined in claim 3 wherein to form the solution mixture, an ethylene glycol or a mixture of ethylene glycols of differing molecular weight is added as the pore former and water is added as the precipitating agent to the dissolved copolymer.

5. The process defined in claim 4 wherein the pore former is a mixture of polyethylene glycol (PEG) (molecular weight 400) and diethylene glycol (DEG) (molecular weight 100) mixed in a proportion of PEG:DEG=2:1.

6. The process defined in claim 2 wherein to form the solution mixture, a basic mixture is first prepared from
13.9% by weight copolymer
5.6% by weight LiCl and
80.5% by weight dimethylformamide
and this basic mixture is diluted to 7-9% copolymer content with dimethyformamide together with addition of effective amounts to precipitate and coagulate said copolymer of pore former and precipitating agent.

7. The process defined in claim 1 for the production of filter membranes having a symmetric cell structure and pore size of from 0.05 μm to 10 μm wherein a semifinished filter membrane is formed from said solution mixture on a smooth surface which is chemically inert and impermeable to the solution mixture, said solution mixture containing 7 to 9% by weight of said aromatic polyamide, about 25% by weight of said pore former, the remainder said precipitation agent and solvent;

treating said semifinished filter membrane in a precipitation and coagulation bath containing about 25% by weight of said pore former, 27 to 47% by weight of water as the precipitating agent, the remainder being solvent, at a bath temperature of from 19° C. to 35° C. over a period of 4 to 8 minutes, the resulting filter membrane being then washed in water, and wherein the polyamide content of the said solution mixture, within said range of between 7 and 9% by weight, is selected in the sense that a higher membrane density is obtained with a higher polyamide content of the solution mixture;

and the water content of the precipitation and coagulation bath, within said range of between 27 and 47% by weight, is selected such that a higher membrane density is obtained with a higher water content in the precipitation and coagulation bath; and the temperature of the precipitation and coagulation bath within said range of between 19° C. and 35° C., is selected such that a lower membrane density is obtained with a higher temperatue of the precipitation ans coagulation bath.

8. The process defined in claim 7 wherein immediately after the membrane mixture has been poured out, a reinforcing layer of woven or non-woven web is embedded in a surface of the poured layer.

9. The process defined in claim 7 wherein the solution mixture has the following composition:
 7 to 9% by weight of copolymer of m-phenylene diamine and isophthalic acid having a decomposition point at 370° C.,
 2.8 to 3.6% by weight of lithium chloride,
 25by weight of polyethylene glycol (400)/diethylene glycol mixture 2:1,
 4% by weight of water,
 remainder dimethylformamide, and the precipitation and coagulation bath has the following composition:
 48% by weight of dimethylformamide
 25% by weight of polyethylene glycol (400)/diethylene glycol mixture 2:1,
 27% by weight of water.

10. The process defined in claim 1 wherein exposure of the semifinished filter element to surrounding air before its introduction into the precipitation and coagulation bath is unavoidable, the time of contact of the semifinished filter element with the surrounding air is limited to a maximum of 5 to 10 minutes and it is ensured that virtually no precipitation or coagulation of the aromatic polyamide occurs when the semifinished filter element comes into contact with the air.

11. The process defined in claim 7 wherein said solution mixture is poured out on a smooth surface which is chemically inert and impermeable to the solution mixture to form, as said semifinished filter membrane, a layer having a thickness corresponding to the desired membrane thickness, the filter membrane being formed from this layer by treating in said precipitation and coagulation bath.

12. The process defined in claim 7 wherein a woven or nonwoven web is impregnated with said solution mixture.

13. The process defined in claim 1 for production of a membrane-deep filter combination, in which the membrane has a symmetric cell structure and a pore size of from 0.05 μm to 10 μm, wherein a semifinished filter element is formed by brush-coating said solution mixutre onto one side of a deep filter layer in a thickness corresponding to the desired membrane thickness;

said solution mixture containing 7 to 9% by weight of aromatic polyamide and about 25% by weight of pore former, the remainder precipitating agent and aprotic solvent;

the semifinished filter element thus formed is treated in a precipitation and coagulation bath containing about 25% by weight of pore former, 27 to 47% by weight of water as the precipitation agent, the remainder solvent, at a bath temperature of from 19° C. to 35° C. over a period of from 4 to 8 minutes to form the filter membrane;

and the resulting filter membrane is then washed out in water;

and wherein the polyamide content of said solution mixture, within said range of between 7 and 9% of weight, is selected in the sense that a higher membrane-density is obtained with a higher polyamide content of the solution mixture and the water content of the precipitation and coagulation bath within said range of between 27 and 47% by weight, is selected in the sense that a higher membrane density is obtained with a higher water content; and the temperature of the precipitation and coagulation bath, within said range of between 19° C. and 35° C. is selected, in the sense that a lower membrane density is obtained with a higher temperature of the precipitation and coagulation bath.

14. The process defined in claim 1, for the production of filter bodies having inserted therein a filter-active substance consisting of aromatic polyamide and having a symmetric cell structure with a pore size of from 0.05 μm to 10 μm, wherein to form the semifinished filter element, a filter body having coarse porosity is steeped in or impregnated with said solution mixture;

said solution mixture containing 7 to 9% by weight of aromatic polyamide and about 25% by weight pore former, the remainder precipitation agent and solvent;

wherein the thus formed filter element is treated in a precipitation and coagulation bath containing about 25% by weight of pore former, 27 to 47% by weight of water as the precipitation agent, remainder solvent, at a bath temperature from 19° C. to 35° C. over a period of from 4 to 8 minutes and the resulting filter body is then washed out in water;

and wherein the polyamide content of said solution mixture, within said range of between 7 and 9% of weight, is in the sense that a higher membrane density is obtained with a higher polyamide content of the solution mixture and the water content of the precipitation and coagulation bath within said range of between 27 and 47% by weight, is selected in the sense that a higher membrane density is obtained with a higher water content; and the temperature of the precipitation and coagulation bath, within said range of between 19° C. and 35° C. is selected in the sense that a lower membrane density is obtained with a higher temperature of the precipitation and coagulation bath.

* * * * *